UNITED STATES PATENT OFFICE.

GEORGE W. SCOLLAY, OF ST. LOUIS, MISSOURI.

IMPROVEMENT IN PROCESSES OF PREPARING AND PRESERVING MEATS.

Specification forming part of Letters Patent No. 187,985, dated March 6, 1877; application filed April 8, 1876.

*To all whom it may concern:*

Be it known that I, GEORGE W. SCOLLAY, of St. Louis, Missouri, but at present residing in the city of New York, have invented certain new and useful Improvements in the Process of Preparing, Refrigerating, and Keeping Meats Fresh for transportation between distant points or at any given point; and I do hereby declare the following to be such a full, clear, and exact description of my said invention as will enable others skilled in the arts to which it appertains to make, use, and practice the same.

The object of my invention is to provide means for preserving from decay, and in a natural and fresh state, meat and animal matter for food, and other perishable substances which fall within its scope.

My invention consists of a chemical and mechanical method of reducing the temperature, first, of the carcass; secondly, of the apartment or chamber in which the meat is to be stored for the purpose of securing more perfect permeation with infiltration through the vascular system, in combination with moderate reduction of temperature and chemical maintenance of pure air kept constantly in motion in the apartment in which the meat is kept, using each separately or as a whole; thirdly, in the combination of a series of separate steps, by which the object, as a whole, is attained, as hereinafter fully described.

The operation is as follows: First, the animal is slaughtered in the usual manner. After the blood has ceased to flow, a connection is made between one of the larger arteries or the heart and a tank or receiver containing lightly compressed or liquefied gas or gases, which are allowed to escape into a globe or second receiver, expand, and to pass freely into and through the vascular system. Any gas or gases not otherwise objectionable may be used for the reduction of temperature in the carcass, and the mechanical purpose of distending the blood-vessels and aiding the infiltration. Care should be taken to so regulate the flow of the gas as to avoid rupturing the vessels, through which it is made to permeate all and every part of the carcass, removing obstructions in and distending the vessels for the reception of the solution which is to follow. The reduction of the temperature is governed by the capacity of the gas to absorb heat. The carcass, being now reduced in temperature, and the vessels cleared and distended by means of the introduction of the gas, is thoroughly infiltrated with a solution of prepared sugar from a reservoir placed at an elevation sufficient to produce the necessary head to insure a thorough permeation of the solution through the carcass, which permeation may be further perfected by the use of the gas after the solution, if necessary.

The sugar is prepared and treated substantially as follows: To every seven and one-half pounds ($7\frac{1}{2}$ lbs.) of white or best brown sugar add ten (10) drams of pulverized carbon and one-half ($\frac{1}{2}$) ounce each of benzoic, salicylic, and boracic acids; pulverize, mix, and thoroughly incorporate these with the sugar. This mixture is then placed in a closed or tight box or other suitable vessel, provided with the means of stirring the compound or mixture, and subjected to the action of sulphurous-acid gas and the vapor of hydrate of phenol, using sixteen ounces of the former to thirty grains of the latter. Next, take eight (8) pounds of alkali, which is to form a triple base, composed of the carbonate of ammonia, potash, and soda, mixed in their equivalent proportions, using two equivalents of soda, and dissolving in thirty-two (32) pounds of pure water, and then subjected to the action of the vapor of hydrate of phenol ($C_{12}H_5O + HO$) and sulphurous acid, ($SO_2$,) using one and one-half ($1\frac{1}{2}$) dram of the former, and continuing the flow of gas until a neutral solution is formed of a specific gravity of 1.200. The ammonia should be dissolved separately, and added to the double alkali while receiving the acid. The sugar compound is further treated by being mixed with this neutral solution raised to the boiling-point, in the proportion of seventy-five pounds (75 lbs.) of sugar to one hundred (100) gallons of the solution. This mixture is now left to cool and settle, when it is strained and tested; and if found to contain an excess of acid, as is the case, it is reduced by adding chlorate of soda until it shows a faint acid reaction.

In preparing the above compound solution the proportions may be varied, and are, to suit the season of the year, and object for which it is to be used, and the alkaline solution may be either single, double, or triple. The latter, however, gives the best result or product. This compound solution, although intended for use in and through the vascular system, may also be used as a bath for the immersion of flesh and other substances.

Having described the first and second steps in the operation, and the plan of preparing the substances used in and for the purpose described, the third step is accomplished as follows: To avoid all forms of deterioration during transportation between distant points, or in keeping at any given point, the meat is placed in an apartment or other suitable chamber or receiver, in which the air is kept pure by the escape therein of ammoniacal and sulphurous-acid gases, or other suitable gases. These gases may be generated in the apartment, or allowed to flow into it from the exterior by means of suitable connections with the receivers or generators of the gases. In either case these gases should escape in the chamber in equivalent quantities by volume, thereby diffusing through the apartment a neutral gaseous product, except when from any cause carbonic acid may abound; then the ammoniacal gas may be slightly in excess. The fourth and last step completes the process for practical and commercial uses at all seasons of the year, and is a part of the invention, substantially as follows: A reduced or temperate temperature not exceeding fifty-five (55°) or sixty (60°) degrees of Fahrenheit is maintained by providing two or more suitable receivers of such capacity and strength as may be required for the purpose filled with ammoniacal and sulphurous-acid gases in a highly compressed or liquefied state. These receivers are to be fitted with suitable means for allowing the gases to escape in their equivalents by volume, and are to be placed in different or opposite parts of the apartment, or connected with it from without, and arranged to discharge against metallic plates, thereby diffusing the cold produced, while the gases themselves, as they come in contact with each other, are instantly neutralized with the effect upon the air above stated.

In the practice of this step in the process, I do not confine myself to the above-named gas or gases to obtain a reduction of temperature in the chamber, as other gas or gases may be used not otherwise objectionable, and where the object is merely to reduce the temperature, other suitable means may be employed without or with ventilation in the apartment or storing-chamber.

The advantages of this invention are many, and may be briefly, though generally, stated to be, the perfecting of a complete plan for keeping and transporting, for commercial purposes, meat and animal matter fresh for food at all seasons of the year without loss or deterioration.

I claim, therefore, and desire to secure by Letters Patent—

1. In preserving meat, the process of preparing the carcass for infiltration and permeation, which consists in introducing compressed or liquefied gas or gases into the arterial and venous system, as described, whereby the blood-vessels are cleared, and the temperature of the carcass reduced, as set forth.

2. The process of preparing a composition, as set forth, to be used in the preservation of meat, and which consists in mixing with sugar, pulverized carbon, benzoic, salicylic, and boracic acids, stirring in a tight or closed box, then treating with sulphurous-acid gas and the vapor of hydrate of phenol, and then adding a neutral solution consisting of the alkaline carbonates, ammonia, potash, and soda, subjected to the action of hydrate of phenol and sulphurous-acid gas.

3. The process of preventing deterioration, by molding or otherwise, of preserved fresh meats, which consists in subjecting such meats in suitable compartments to an atmosphere, resulting from the introduction therein of an alkaline and an acid gas or gases in their equivalent quantities by volume, substantially as described.

4. The process of preserving the prepared meat, whereby it is subjected at once to the action of an antiseptic atmosphere, and to a refrigerating influence or moderately low temperature, which consists in introducing sulphurous-acid and ammoniacal gases, or other suitable gases, in their equivalent quantities, by volume, under suitable pressure, and in the manner substantially as described.

5. The process of preserving fresh meat or animal matter, which consists of subjecting it to successive antiseptic influences, as follows: first, by infiltrating or treating it with an antiseptic that leaves it fresh; second, by storing it in a compartment having its temperature reduced and kept from rising above 60° of Fahrenheit.

In witness whereof I have hereunto signed my name in presence of the subscribing witnesses this the 7th day of April, 1876.

GEO. W. SCOLLAY.

Witnesses:
L. G. GARRETTSON,
AMOS BROADNAX.